Nov. 1, 1932.  O. H. BASQUIN  1,885,405
COTTON HARVESTING APPLIANCE
Filed Aug. 21, 1931  6 Sheets-Sheet 3

Patented Nov. 1, 1932

1,885,405

UNITED STATES PATENT OFFICE

OLIN H. BASQUIN, OF CHICAGO, ILLINOIS, ASSIGNOR TO G. R. MEYERCORD, OF CHICAGO, ILLINOIS

COTTON HARVESTING APPLIANCE

Application filed August 21, 1931. Serial No. 558,517.

The present invention relates to cotton harvesting machines of the type wherein picker fingers projecting slightly from the periphery of rotating drums are revolved rapidly about axes radial to the drum, first in one direction to collect the cotton and then in the opposite direction to doff the cotton, through contact with stationary segmental tracks within the drum; and it has for its object to improve the construction and operation of the means for rotating the picker elements in the drum.

In a modern form of machine, the segmental tracks are made of flexible material, the inner ends of the picker elements being yieldingly pressed against the tracks to secure traction, by means of resilient rollers, preferably made of rubber. The rotary movements of the picker elements in opposite directions are brought about by so placing the segmental tracks that each picker element, during a predetermined angular movement with the drum, rides underneath and in contact with one of the segments and, during a different predetermined angular movement with the drum, rides on top of another segmental track. One of the objects of the present invention is to provide means for positively shifting the resilient rollers so as to bring them, without any work being done by the tracks themselves, into the proper positions effectively to hold the picker elements in good tractive relation to the tracks, regardless of whether the picker elements are on top of or underneath the tracks.

A further object of the present invention is to produce a simple and novel track construction which will make the tracks simple and inexpensive and permit them to be readily placed in position or removed.

The resilient rollers that cooperate with the picker elements to produce traction for the latter are supported by slides mounted on the drum for limited vertical movements; the slides being positively moved, by means of stationary cams, to carry the rollers into engagement with the upper sides of those tracks below which the picker elements run and positively to force the rollers down so as to run along the under sides of the tracks along the tops of which the picker elements roll. Therefore, viewed in one of its aspects, the present invention may be said to have for its object generally to improve the construction of picker drums of cotton harvesting machines.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1:
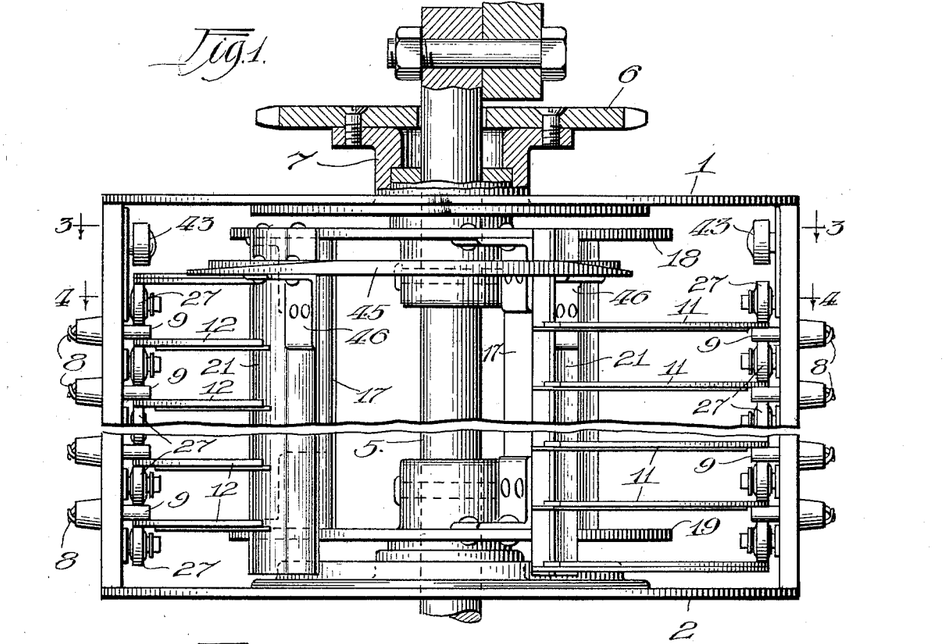
Figure 1 is a view, partly in vertical section and partly in elevation, with portions of the wall of the drum omitted, showing one of my improved drums.
Figure 2:
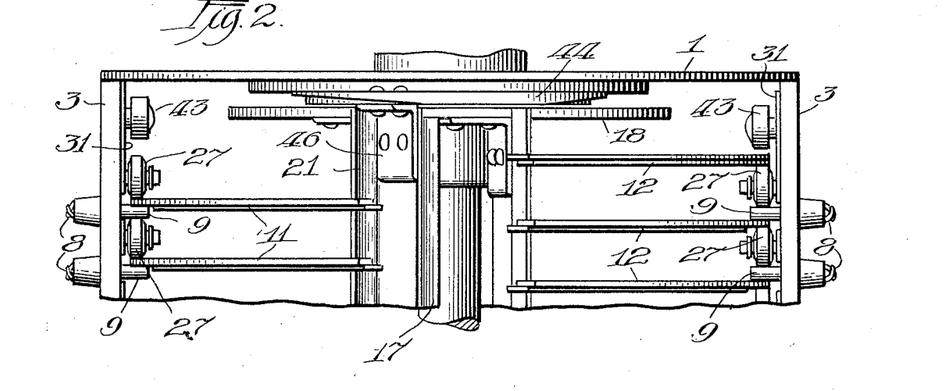
Fig. 2 is a view similar to Fig. 1, looking at the side of the drum from a different angle.
Figure 3:
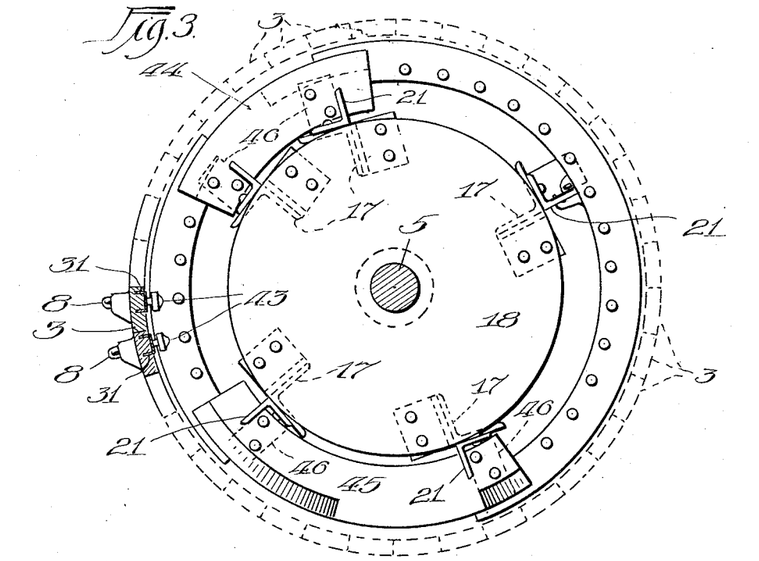
Fig. 3 is a section taken approximately on line 3—3 of Fig. 1, only a fragment of the cylindrical wall of the drum being shown in full lines.
Figure 4:
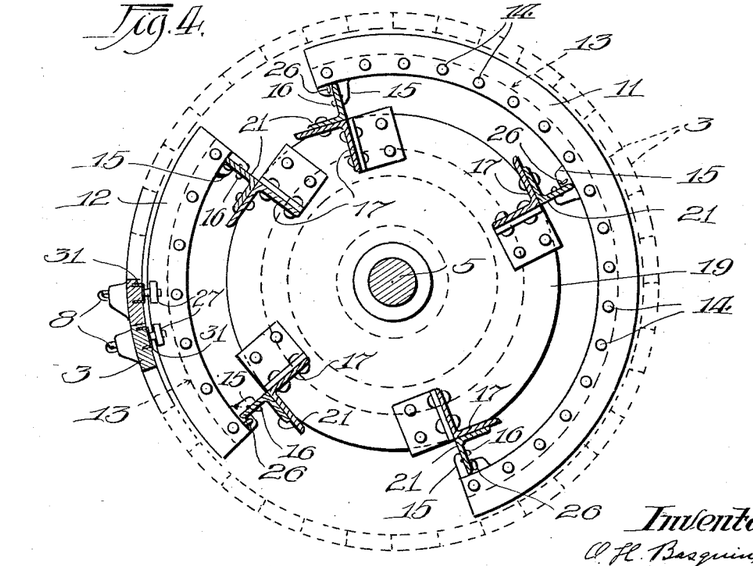
Fig. 4 is a section approximately on line 4—4 of Fig. 1, only a fragment of the cylindrical wall of the drum being shown in full lines.
Figure 5:
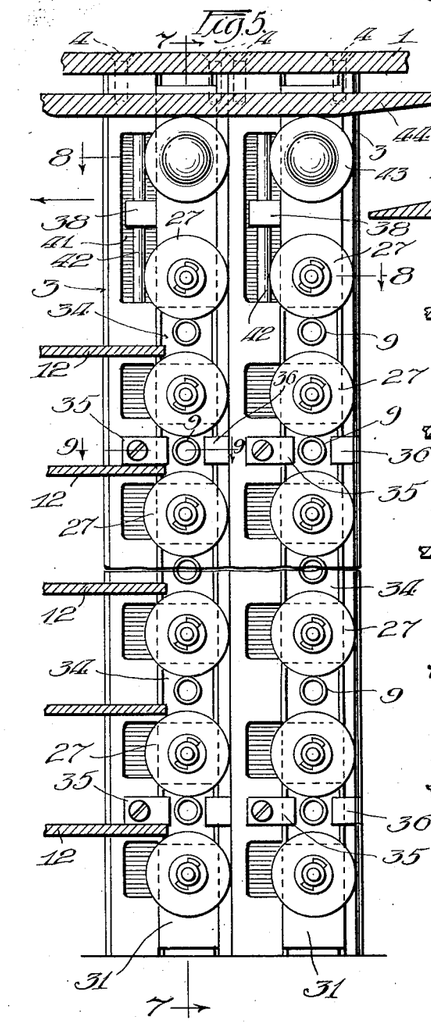
Figs. 5 and 6 are views, on a larger scale, showing two vertical panels in the cylindrical wall of the drum, as viewed from the inside, the upper end of the drum, the stationary cams, and the segmental tracks being shown in section.
Figure 6:
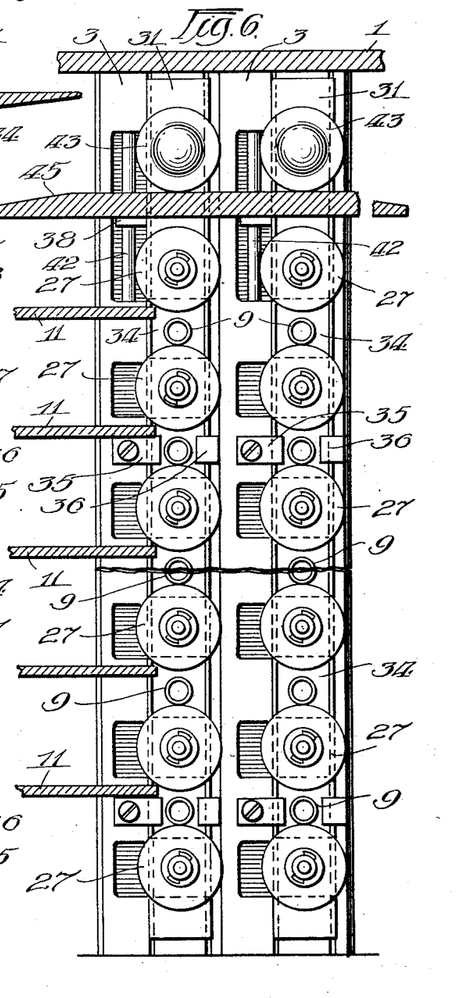
Figure 7:
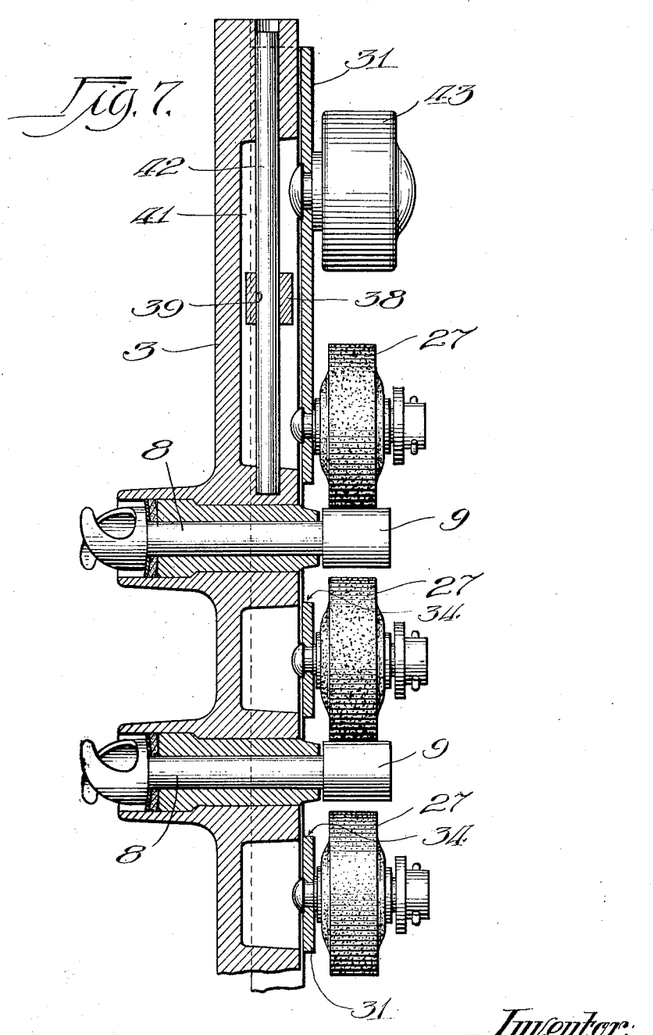
Fig. 7 is a section on a still larger scale, taken on line 7—7 of Fig. 5.

Referring to Figs. 1-13, 1 and 2 represent the upper and lower heads or ends of a hollow cylindrical upright drum. The cylindrical wall of the drum is shown as being formed of a series of stiff vertical metal staves 3 which, as best shown in Fig. 5, are secured to the drum ends by means of screws 4 extending through the drum ends into the end edges of the staves. The drum is rotatable about a stationary vertical shaft 5. The drum is rotated in a suitable way wherein the present invention is not concerned. However, there is shown a sprocket wheel 6 loosely surrounding the upper end of the shaft above the drum and fixed to a central hub 7 rising from the drum; whereby the drum may be rotated by means of a sprocket chain passing around this wheel.

Each stave carries a series of picker elements 8 extending radially through the same so as to form a vertical row; the projecting inner ends of the picker elements being in the form of small cylinders 9 that constitute rollers. The details of these picker elements, however, form no part of the present invention.

Housed within the drum are two groups of stationary segmental tracks, the working portions of which, indicated at 11 and 12, are composed of flexible material. The tracks are all horizontal and the working portions thereof are large enough in diameter to permit them to overlap the inner end portions 9 of the picker elements. The vertical spacing of the tracks of each group is uniform and is equal to the spacing of the picker elements in each vertical row. The combined angular length of the two groups of tracks is less than 360°; and the two groups are so placed that the ends of the tracks in one group are spaced apart from the ends of the tracks in the other group. Each track is composed of the flexible segment and a cooperating, narrower metal segment 13, underlying the same along the inner edge, the two segments being secured together in any suitable way, preferably by means of rivets 14. Each metal segment has at its ends ears 15 lying in the plane of the segment and projecting inwardly from the concave edge. Each ear terminates at its inner end in a hook 16. The tracks of one group are much longer than those of the other, and each, therefore, has at the middle a third ear and hook. The tracks may conveniently be supported from stationary uprights 17, of which five are shown; these uprights being so disposed angularly of the axis of rotation of the drum that each will engage with an ear and its hook on each track of one group, and thus support the tracks in their proper positions.

In the arrangement shown, the stationary shaft 5 has fixed thereto, within the drum, two horizontal disks 18 and 19 lying near the top and the bottom of the drum, respectively. The uprights 17 extend between and are fixed to these disks. Secured to the outer side of each upright is a metal member having a radial flange 21 extending throughout the length of the upright. Each of these flanges is provided at intervals with deep edge notches 23 and with a hole 24 lying a short distance inwardly from the end of each notch. The width or height of each notch is equal to the thickness of the metal element 13 of one of the tracks. In assembling the tracks in the structure, the ears thereon are inserted in corresponding notches in the uprights that are to support the track, and the track is then moved lengthwise until the hooks enter the holes 24; the hooks being all turned in the same direction so as to permit them to enter or leave the holes 24 through an endwise movement of the corresponding track. In order to prevent the tracks from becoming displaced, each ear may be provided on the side opposite that on which the hook is located with a hole 25 into which may be dropped a pin or key 26.

In this type of machine, the picker elements are rotated through the engagement of their inner end portions 9 with the tracks. The two groups of tracks are displaced from each other in the vertical direction to such an extent, and are so positioned, that the inner ends of the picker elements will pass over the tops of the tracks 12 and underneath the tracks 11. It is necessary to press the tracks and the picker elements together in order to secure traction, this being usually accomplished by employing resilient idle rollers, preferably made of rubber. I likewise employ such rollers, which are indicated at 27; the rollers alternating with the inner ends of the picker elements in each vertical row of picker elements. These idle rollers are of large diameter, the combined diameters of the inner end of the picker element and of an idle roller being slightly greater than the distance between the upper face of a track and the under face of the next higher track. Or, in other words, the shortest distance between the inner ends of two adjacent picker elements in any row, less the diameter of one of the idle rollers, is not as great as the thickness of one of the tracks, so that when an idle roller is resting against one picker element and a track is entered between this roller and the other adjacent picker element, the roller will be slightly compressed and thus yieldingly hold the latter picker element and the track in driving relation to each other. The idle roller, of course, also has traction on the opposite side of the track and it presses against the picker element with which it contacts and which is running on another track and thus assists in turning the latter picker element. In other words, each picker element is driven through direct contact with a track and also through contact with one of the resilient rollers which, in turn, is being rotated on account of being engaged with another track.

Figures 8, 9, 10, 11, 12, 13:
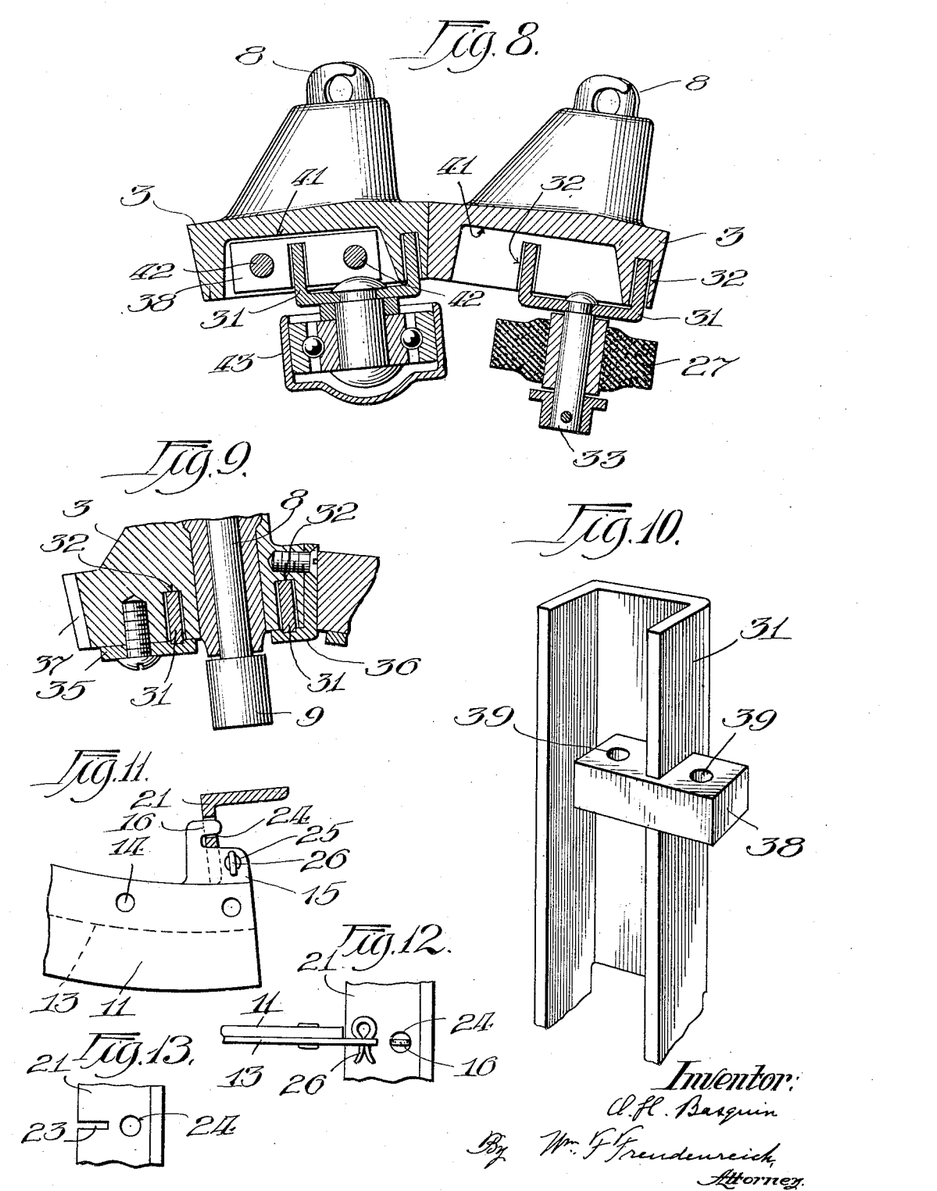
Fig. 8 is a section taken on two different planes, as represented by line 8—8 of Fig. 5.
Fig. 9 is a section on line 9—9 of Fig. 5.
Fig. 10 is a perspective view of the upper end of one of the roller supporting slides.
Fig. 11 is a horizontal section taken in the plane of one of the stationary segmental tracks, showing one end of the track and a fragment of the upright supporting the same.
Fig. 12 is an elevation of the parts shown in Fig. 11, looking at the structure from the right-hand side of Fig. 11.
Fig. 13 is a view similar to Fig. 12, showing only the upright.

It is obvious that the idle rollers must shift up and down to permit the picker elements to pass under the tracks of one group and over the tracks of the other group. Therefore, in order to avoid the necessity of having the tracks themselves do the work of shifting the idle rollers up and down, and thus causing excessive wear at the ends of the tracks, I have provided means for positively raising and lowering the idle rollers, so that, when they pass from one group of tracks to the other, they are at the proper elevations to run above or underneath the tracks, as the case may be. To this end, I have mounted all of the idle rollers in each row on a vertical slide suitably supported on the corresponding stave or slab of the peripheral wall of the drum, and I have also provided cam tracks positioned to shift these slides up and down at the proper points in the rotation of the drum. In the arrangement shown, each slide is simply a structural steel element 31 of channel section, each slab or stave having on the inner side vertical grooves 32 to receive the flanges of the slide. As best shown in Fig. 8, the idle rollers turn on stub shafts 33 fixed to and projecting from the connecting webs between the flanges of the slides. Also, as shown in Fig. 9 and in Figs. 5 and 6, this connecting web is cut away to provide windows 34 through which the inner ends of the picker elements project; these windows being large enough to prevent interference by the slides with the picker elements as the slides move up and down. Each slide may be held to its support by suitable clips such as indicated at 35 and 36, for example. Each clip 35 is illustrated as comprising simply a small plate held by a screw to the inner side of the stave and overlapping the edge of one of the flanges of the corresponding guide exposed by cutting away the web to form a window. The clip 36, on the other hand, is shown as taking the form of an L-shaped plate, one arm of which lies in a groove 37 cut transversely across an edge of the stave, while the other arm overlies the guide in the same manner as does the clip 35. It will be seen that, when the staves are assembled upon the drum, the clips 36 are positively held against removal until the slab on which they are mounted, or the adjacent slab, is taken off the drum. For the purpose of securing extreme accuracy in guiding the slides in the vertical direction, each slide, as best shown in Figs. 5, 6, 8 and 10, may have welded to one flange, near the upper end, a thick metal block 38 projecting into the trough of the guide and also beyond one side of the slide. This block has in the ends vertical holes 39 drilled through the same. The stave is cut away on the inner side to form a wide, long pocket 41 in which the block may lie and within which it may move up and down. Extending vertically across the pocket 41 are two stationary cylindrical posts or rods 42 which make a sliding fit in the holes 39 in the block. Therefore, as the slides move up and down, they are accurately guided through the engagement of their blocks, acting as cross heads, with the fixed guide rods or bars.

Each slide carries near its upper end, in line with the row of idle rollers, a roller 43 by means of which the slide is raised and lowered; these upper rollers being adapted to engage with suitable cam tracks 44 and 45. These cam tracks span the gaps between the ends of the two groups of tracks so that, as the picker elements travel toward a point at which their direction of rotation must be the reverse of what it was previously, namely, from one group of tracks to the other, the slides will be raised or lowered, as the case may be. These cam tracks are so located that, as the drum revolves, the rollers 43 travel on top of the cam track 45 and thus raise the slides, whereas, when they reach the cam track 44, they are pushed down, carrying the slides with them. The cam tracks are simply rigid metal segments supported by suitable brackets 46 from the uprights 17.

Figures 14, 15, 16:
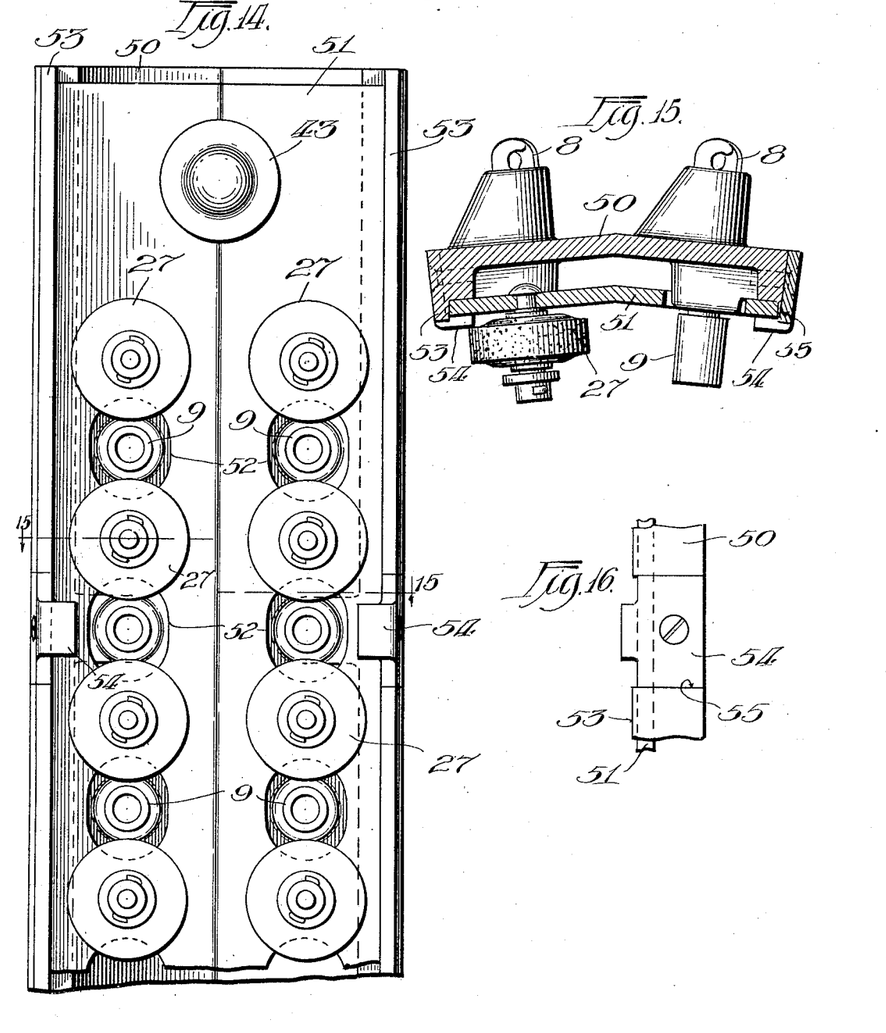
Fig. 14 is a view looking at the inner side of a modified form of one of the staves of which the cylindrical wall of the drum is formed, showing the picker elements and the cooperating resilient rollers, only the upper part of the stave being illustrated.
Fig. 15 is a section taken approximately on line 15—15 of Fig. 14.
Fig. 16 is an edge view of the stave in the vicinity of one of the slide clamps shown in Figs. 14 and 15.

In the arrangement shown in Figs. 14-16, the stave 50 is made twice as wide as the staves heretofore described, so as to carry two vertical rows of picker elements 8. The two corresponding rows of resilient rollers 27 are supported by a single wide slide 51 having windows 52 cut through the same to clear the inner ends of the picker fingers. The stave has ledges or guide ribs 53 projecting from the inner side at the long edges, the slide fitting between these ledges or guides so as to be accurately guided thereby in its vertical movements. The slide may be held to the stave by means of clips 54, similar to the clips 36 heretofore described; each of these clips consisting of an L-shaped member, one flange of which fits into a notch 55 cut into the edge of the stave, and the other flange overlying the inner face of the slide. If the ledges or guides 53 are higher than the thickness of the slide, they must be cut away where the clips occur so as to permit the clips to engage with the inner face of the slide.

This modified arrangement permits the number of rollers 43 to be cut in half, since there need be only one of these rollers for each slide instead of one roller for each vertical row of picker fingers.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. The combination with a rotatable hollow drum, two angularly spaced groups of stationary segments of flexible material within the drum, the segments lying in planes at right angles to the axis of rotation of the drum, vertical rows of rotatable picker fingers projecting radially through the wall of the drum and having inner ends adapted to overlap the segments, the two groups of segments being so placed lengthwise of the drum that each picker finger passes under a segment of one group and over the corresponding segment of the other group during each revolution of the drum, of idle rollers on the drum beside and cooperating with the inner ends of the picker fingers to press the segments and the fingers into driving contact with each other, and means positively to shift said rollers lengthwise of the drum as the fingers pass from one group of segments to the other to maintain the proper driving relation between each finger and each of the segments along which it travels.

2. The combination with a rotatable hollow drum, two angularly spaced groups of stationary segments of flexible material within the drum, the segments lying in planes at right angles to the axis of rotation of the drum, vertical rows of rotatable picker fingers projecting radially through the wall of the drum and having inner ends adapted to overlap the segments, the two groups of segments being so placed lengthwise of the drum that each picker finger passes under a segment of one group and over the corresponding segment of the other group during each revolution of the drum, of idle rollers on the drum beside and cooperating with the inner ends of the picker fingers to press the segments and the fingers into driving contact with each other, the rollers alternating with the picker fingers in each row, the parts being so proportioned that each roller may engage with either of the two picker fingers between which it lies and leave space between it and the other finger to receive one of the segments, and means positively to shift the rollers lengthwise of the drum as the corresponding fingers pass from one group of segments to the other.

3. In combination, a rotatable hollow drum, picker fingers projecting radially through the perpiheral wall of the drum, stationary segments of flexible material located in the drum and adapted to engage the inner ends of the fingers and cause them to rotate by rolling along the segments as the drum revolves, some of the segments being displaced angularly of the drum with respect to others and being also displaced slightly lengthwise of the drum whereby some of the segments engage with one side of the picker fingers and the other segments engage with the other side of the fingers, devices cooperating with the fingers yieldingly to press the segments against the fingers to secure traction, and means positively to shift said devices to cause them to hold the segments to the fingers regardless of on which side of the fingers the segments happen to lie.

4. In combination, a rotatable hollow drum, picker fingers arranged in rows extending lengthwise of the drum and projecting radially through the wall thereof, two groups of stationary segments of flexible material within the drum, the segments being spaced apart uniformly and lying in planes at right angles to the axis of rotation of the drum, the two groups being spaced apart angularly of the drum and those of one group being positioned to overlap and engage with the upper side of the fingers and those of the other group being positioned to overlap and engage with the fingers on the lower side, rubber rollers alternating with the fingers of each row within the drum, the sum of the diameters of a picker finger and rubber roller being slightly less than the distance between adjacent segments, and means positively to shift the rollers in each row lengthwise of the row as the corresponding fingers pass from one group of segments to the other.

5. In combination, a rotatable hollow drum, picker fingers arranged in rows extending lengthwise of the drum and projecting radially through the wall thereof, two groups of stationary segments of flexible material within the drum, the segments being spaced apart uniformly and lying in planes at right angles to the axis of rotation of the drum, the two groups being spaced apart angularly of the drum and those of one group being positioned to overlap and engage with the upper side of the fingers and those of the other group being positioned to overlap and engage with the fingers on the lower side, rubber rollers alternating with the fingers of each row within the drum, the sum of the diameters of a picker finger and rubber roller being slightly less than the distance between adjacent segments, a common support for the rollers in each row mounted on and movable lengthwise of the drum, and means positively to shift each support as the corresponding fingers are about to pass from one group of segments to the other so that the rollers engage with the under sides of the fingers when the fingers underlie the segments and engage with the upper sides of the fingers when the fingers overlie the segments.

6. In combination, a rotatable vertical hollow drum, picker fingers arranged in vertical rows on and projecting radially through the wall of the drum, groups of stationary segments of flexible material within the drum, the segments being spaced apart uniformly and lying in planes at right angles to the axis of rotation of the drum, the groups of segments being spaced apart angularly of said axis and those of one group being positioned to overlap and engage with the upper sides of the fingers while those of another group are positioned to overlap and engage with the undersides of the fingers when the drum is rotated, devices cooperating with the fingers to press the fingers and segments together when they are in contact with each other, supports for said devices mounted on the drum for movements lengthwise thereof, and stationary cam tracks in the paths of said supports to engage and shift them while the corresponding fingers are travelling from one group of segments to the other.

7. A drum of the character described, comprising end members and detachable staves secured to said end members, picker fingers arranged in rows extending along said staves and projecting radially through the same, slides mounted on the inner sides of the staves and movable lengthwise of the staves, and resilient rollers on said slides alternating with the picker fingers.

8. In an apparatus of the character described including a hollow drum rotatable about a vertical axis and provided with picker elements adapted to be turned about axes radial to the drum through engagement with tracks within the drum, separated uprights arranged within the drum and having edge notches, tracks for the picker elements comprising segments resting in said notches and projecting therefrom, said uprights also having holes in the side near said notches, and hooks on said segments entered in said holes, said hooks facing in the same direction to permit the segments to be applied to the supports by a lengthwise movement.

9. A track member for picker elements of a cotton harvesting machine comprising a metal strip in the shape of a segment of a flat ring, said strips having hooks lying in the plane thereof at the ends and projecting inwardly from the concave edge of the segment, and a segmental strip of flexible material secured to and lying upon one of the flat faces of the metal strip.

In testimony whereof, I sign this specification.

OLIN H. BASQUIN.